United States Patent [19]

Takahashi et al.

[11] 4,203,038
[45] May 13, 1980

[54] HIGH DENSITY SPENT FUEL STORAGE RACK

[75] Inventors: Toshiyori Takahashi, Hitachi; Akihiro Ojima, Takahagi; Teruo Matsumoto, Ibaraki; Koji Kashiwakura, Hitachi, all of Japan

[73] Assignee: Hitachi, Ltd., Japan

[21] Appl. No.: 845,534

[22] Filed: Oct. 26, 1977

[30] Foreign Application Priority Data

Oct. 29, 1976 [JP] Japan .................. 51-130914

[51] Int. Cl.² .............................................. G21F 5/00
[52] U.S. Cl. .................................. 250/507; 250/518
[58] Field of Search .............. 250/506, 507, 515, 518; 176/73, 84, 87, DIG. 2

[56] References Cited

U.S. PATENT DOCUMENTS

| | | | |
|---|---|---|---|
| 3,859,533 | 1/1975 | Swanto | 250/518 |
| 4,004,154 | 1/1977 | Bevilacqua | 250/518 |
| 4,039,842 | 8/1977 | Mollon | 250/518 |

*Primary Examiner*—Bruce C. Anderson
*Attorney, Agent, or Firm*—Craig and Antonelli

[57] ABSTRACT

A high density spent fuel storage rack including a plurality of neutron absorbing containers each designed to perimentrically encircle a fuel assembly, the containers being arranged so that the rack can store a plurality of fuel assemblies disposed vertically in an array with predetermined spaces between the adjacent fuel assemblies. Each of the containers is provided with enlarged upper and lower end portions respectively abutting against enlarged upper and lower end portions of the adjacent containers along their outer peripheries. The abutting end portions are joined by edge-welding to one another whereby the containers are formed into a unitary structure providing predetermined spaces between the adjacent containers.

8 Claims, 6 Drawing Figures

HIGH DENSITY SPENT FUEL STORAGE RACK

LIST OF PRIOR ART REFERENCES

The following reference is cited to show the status of the art:

Japanese Patent Kokai (Laid-Open) No. 114600/76 Frank Bevilacqua, Oct. 8, 1976 (Corresponding to U.S. Pat. No. 4,004,154 issued on Jan. 18, 1977)

BACKGROUND OF THE INVENTION

This invention relates to spent fuel storage racks, and more particularly to a spent fuel storage rack capable of storing at high density a plurality of fuel assemblies which have been used in nuclear reactors.

In nuclear power plants, the spent fuel withdrawn from the reactor cores is temporarily stored in storage racks immersed in a pool of water or other radiation shielding liquid before being reprocessed. In recent years, there has been an increase in the amount of spent fuel removed from the reactor cores, but existing facilities have no sufficient capacity to reprocess the spent fuel at once. In order to cope with this situation, proposals have been made to use high density spent fuel storage racks. For example, Japanese Patent Kokai (Laid-Open) No. 114600/76 filed by Frank Bevilacqua discloses a storage rack of the type described. This storage rack comprises a plurality of neutron absorbing containers arranged to receive a plurality of fuel assemblies disposed vertically in an array with predetermined spaces between the adjacent fuel assemblies, each container being designed to perimentrically encircle a fuel element. The neutron absorptive containers are each rectangular in cross section. In order to form these containers into a unitary structure while maintaining the containers in predetermined spaced relationship, spacers or U-shaped channels are welded to upper end portions and lower end portions of the containers in such a manner that the spacers extend in a grid pattern between the rows of the containers and the columns of the containers. Some disadvantages are associated with this type of spent fuel storage rack. First, it is complex in construction and has many portions where the containers are joined by welding to the spacers. A difficulty is encountered in carrying out welding, and assembling of this type of rack is a time-consuming operation and requires a lot of labor. The containers are preferably hexagonal in cross section for storing fuel assemblies which are also hexagonal in cross section, in order that high density storage can be achieved in a spent fuel storage rack. However, it is practically impossible to use spacers for containers of a hexagonal cross section in the same manner as spacers are used for the containers of the rack of the type referred to above, because the spacers used will increase in number and yet the containers will be located relatively sparsely.

SUMMARY OF THE INVENTION

Accordingly, an object of this invention is to provide a high density spent fuel storage rack wherein portions to be joined by welding are small in number and welding can be carried out with ease.

Another object is to provide a high density spent fuel storage rack which can be fabricated even if the containers are of any polygonal shape in cross section other than square and which is easy to assemble.

According to the invention, there is provided, in a high density spent fuel storage rack including a plurality of neutron absorbing containers each designed to perimentrically encircle a fuel assembly, said containers being arranged so that the rack can store a plurality of fuel assemblies disposed vertically in an array with predetermined spaces between the adjacent fuel assemblies, the improvement wherein each of said containers is provided with enlarged upper and lower end portions which respectively abut against enlarged upper and lower end portions of the adjacent containers along their outer peripheries and said abutting end portions are joined by edge-welding to one another whereby said containers are formed into a unitary structure providing predetermined spaces between the adjacent containers.

DESCRIPTION OF THE PREFERRED EMBODIMENTS

Figure 1:
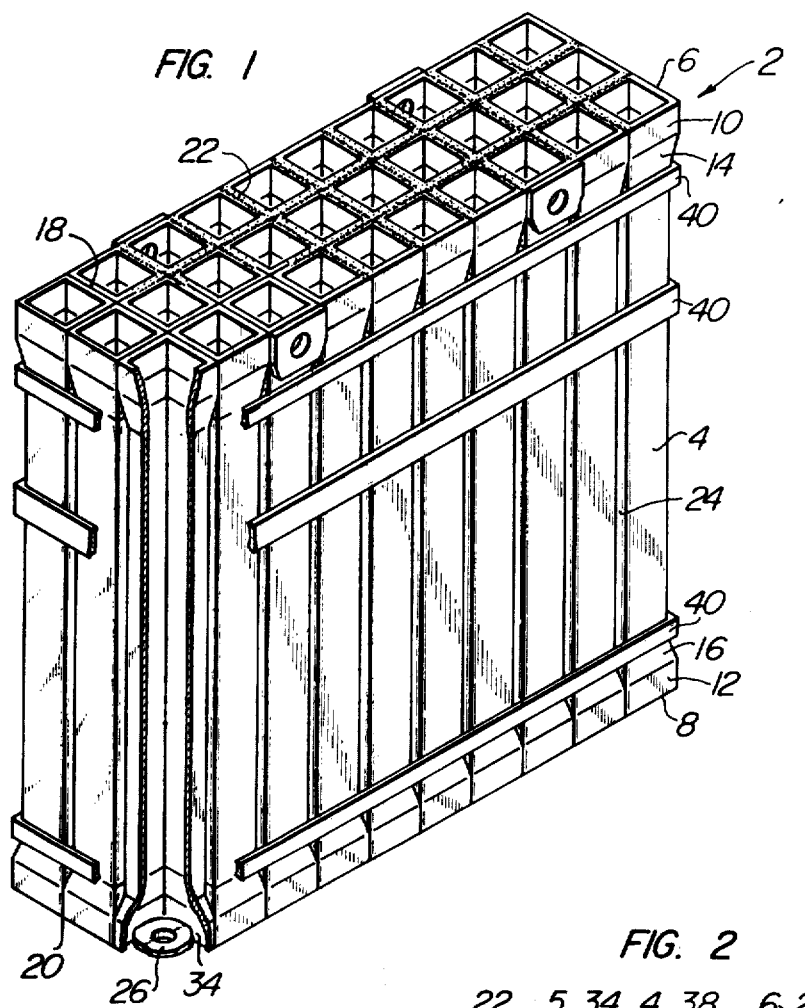
FIG. 1 is a perspective view, with certain parts being cut out, of a first embodiment of the high density spent fuel storage rack in accordance with the present invention.
Figure 2:
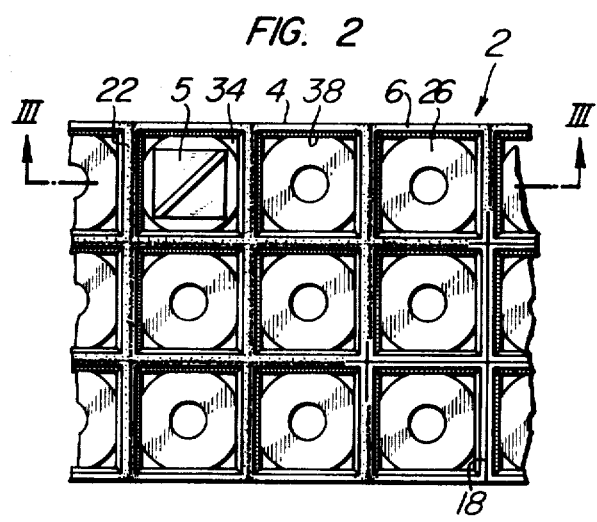
FIG. 2 is a fragmentary top plan view of the rack shown in FIG. 1.
Figure 3:
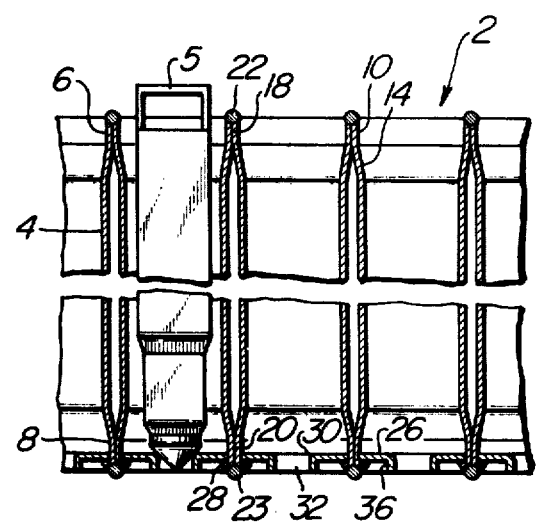
FIG. 3 is a sectional view taken along the line II—II in FIG. 2.

Embodiments of the invention will now be described with reference to the accompanying drawings. In FIGS. 1 to 3, a high density spent fuel storage rack comprising a first embodiment of the invention is generally designated by the reference numeral 2 and includes a plurality of neutron absorbing containers 4 made of stainless steel in the form of elongated hollow members of a square cross section. The containers 4 are arranged vertically to provide an array thereof so that the containers are arranged in rows and columns. In this embodiment, there are 30 containers 4 in the rack 2 which are arranged in 10 columns and 3 rows. By inserting a fuel assembly 5 in each of the containers 4 in such a manner that the former is perimentrically encircled by the latter (See FIG. 5), it is possible to store the fuel assemblies 5 at high density in the rack 2.

Each of the containers 4 has an upper end portion 6 and a lower end portion 8 which are enlarged in size. The enlarged upper and lower end portions 6 and 8 consist of enlarged portions 10 and 12 of a constant cross-sectional area and tapering portions 14 and 16 respectively. Enlarging of the end portions of the containers 4 can be effected by inserting a shaping element (not shown) into each of the containers 4 by means of the force of a hydraulic cylinder and expanding the end portions transversely.

The enlarged upper end portions 6 and lower end portions 8 of the containers 4 are located in a manner to abut against the enlarged upper end portions 6 and lower end portions 8 of the adjacent containers 4 at outer peripheries 22 and 23 thereof, and the abutting upper end portions 6 and lower end portions 8 are joined by edge-welding as designated at 22 and 23. By edge-welding the enlarged upper end portions 6 and lower end portions 8 of the adjacent containers 4 which are maintained in abutting relation, the containers 4 are formed into a unitary structure and at the same time predetermined spaces 24 are provided between the adjacent containers 4. The enlarged upper and portions 6 play the role of facilitating the insertion of the fuel assemblies 5 into the containers 4.

Figure 4:
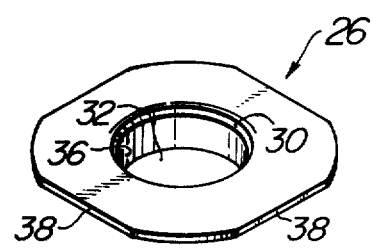
FIG. 4 is a perspective view, on an enlarged scale, of the fuel assembly support member used in the first embodiment of the invention.

A fuel assembly support member 26 made of a stainless steel plate is welded to inner wall surfaces of the enlarged lower end portions 8 of each container 4 as indicated by the reference numeral 28 in FIG. 3. As clearly shown in FIG. 4, each support member 26 is shaped such that it is formed with a central opening 32 which provides a seat 30 for the lower end portion of each fuel assembly 5 inserted in one of the containers 4, and defines passages 34 between the inner wall surfaces of the lower end portion 8 and the support member 26. The passages 34 permit a coolant to flow from one side of each support member 26 to the other side thereof. Each support member 26 can be produced by die pressing a disk having a hole in the center so as to form the seat 30 at the upper edge of the central opening 32 and a skirt 36 extending downwardly from the seat 30 to define the central opening 32 by its inner peripheral surface, and then cutting off portions of the disk in four positions in such a manner that the passages 34 can be formed and welded portions 38 conforming to the inner wall surfaces of each container 4 can be provided. In place of providing the passages 34 between each support member 26 and each container 4, at least one opening may be directly formed in each support member 26.

The numeral 40 designates reinforcing frames joined by welding to the outer peripheral surfaces of the containers formed into a bundle.

The manner in which neutrons attenuation in the rack according to the invention will now be described. The spent fuel in the fuel assemblies stored in the rack emits fast neutrons which collide against the stainless steel plates constituting the containers 4 for the assemblies 5. The fast neutrons have energy of a high intensity such that they pass through the stainless steel plate. The fast neutrons that have passed through the stainless steel plate have their energy level reduced while passing through a coolant or water in the spaces between the adjacent containers, with the result that they become slow neutrons. Finally, the slow neutrons collide against the stainless steel plate of the adjacent container or are reflected by the water in the spaces between the containers to collide against the stainless steel plate through which they have first passed. Thus the energy level of the slow neutrons is reduced such that they are absorbed by a neutron absorbing substance.

The high density spent fuel storage rack in accordance with the invention is of the aforementioned construction. The containers are joined by means of edge-welding effected between the abutting enlarged upper and lower end portions of the adjacent containers. It will be appreciated that the portions to be joined by edge-welding are relatively small in number and the welding operation can be carried out with ease.

Figure 5:
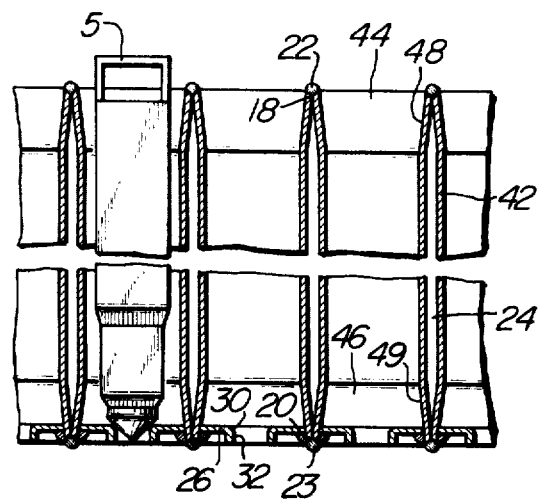
FIG. 5 is a sectional view similar to FIG. 3 but showing a second embodiment of the invention in which the enlarged portions of the containers differ in shape from the enlarged portions of the containers of the first embodiment.

FIG. 5 shows a second embodiment of the invention in which the enlarged upper end portion 44 and lower end portion 46 of each container 42 consist only of tapering portions 48 and 49 respectively. Other parts are similar to those of the first embodiment so that they are designated by like reference characters. By adopting the enlarged upper and lower end portions of the aforementioned shape for each container, there is offered the advantage of forming of the enlarged portions being facilitated.

Figure 6:
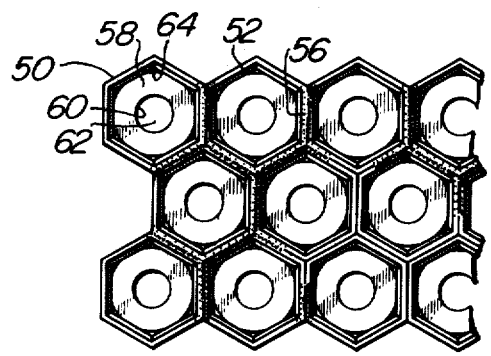
FIG. 6 is a fragmentary top plan view similar to FIG. 2 but showing a third embodiment of the invention in which the containers are hexagonal in cross section.

The essentials of the present invention lie in the fact that the enlarged upper and lower end portions of the adjacent containers maintained in abutting relation are joined by edge-welding. It should be noted, therefore, that the high density spent fuel storage rack according to the invention can be fabricated even if the containers are of any polygonal shape other than square. FIG. 6 is similar to FIG. 2 but shows a third embodiment in which the containers 50 are hexagonal in cross section. The rack of this embodiment is substantially similar in construction to the rack of the first embodiment except for the fact that the containers differ from each other in cross-sectional shape. Therefore, the embodiment shown in FIG. 6 will be explained in brief. The enlarged upper end portions 52 and the lower end portions (not shown) of the adjacent containers 50 maintained in abutting relation are joined to one another by edge-welding as designated at 56, and each fuel assembly support member 58 is welded to the inner wall surfaces of the enlarged lower end portions of one of the containers 50. Each support member 58 is formed therein with the central opening 62 which provides the seat 60 for supporting the lower end portion of each fuel assembly, and defines the coolant passages 64 between the inner wall surfaces of the lower end portion of each container 50 and the support member 58. It will be appreciated that the rack of this embodiment is convenient for storing fuel assemblies of a hexagonal cross section at high density.

What is claimed is:

1. In a high density spent fuel storage rack including a plurality of neutron absorbing containers each designed to perimetrically encircle a fuel assembly, said containers being arranged so that the rack can store a plurality of fuel assemblies disposed vertically in an array with predetermined spaces between the adjacent fuel assemblies, the improvement wherein each of said containers is provided with enlarged upper and lower end portions which respectively abut against enlarged upper and lower end portions of adjacent containers along their outer peripheries and said abutting end portions being joined at their extremities by edge-welding to one another whereby said containers are formed into a unitary structure providing predetermined spaces between the adjacent containers to serve for the flow of coolant fluid.

2. The high density spent fuel storage rack as defined in claim 1, wherein each of said containers is of a square cross section.

3. The high density spent fuel storage rack as defined in claim 1, wherein each of said containers is of a hexagonal cross section.

4. The high density spent fuel storage rack as defined in claim 1, wherein each of said enlarged upper and lower end portions consists of a tapering portion and enlarged portion of a constant cross section contiguous with said tapering portion.

5. The high density spent fuel storage rack as defined in claim 2, wherein each of said enlarged upper and lower end portions consists of a tapering portion and an enlarged portion of a constant cross section contiguous with said tapering portion.

6. The high density spent fuel storage rack as defined in claim 1, wherein each of said enlarged upper and lower end portions consists of a tapering portion.

7. The high density spent fuel storage rack as defined in claim 1, wherein each of said containers is further provided with a fuel assembly support member welded to inner surfaces thereof, said support member having a central opening providing a seat for a fuel assembly and being formed so as to define at least a coolant passage between the support member and said inner surfaces.

8. The high density spent fuel storage rack as defined in claim 4, wherein each of said containers is further provided with a fuel assembly support member welded to an inner surfaces thereof, said support member having a central opening providing a seat for a fuel assembly and being formed so as to define at least a coolant passage between the support member and said inner surfaces.

* * * * *